Nov. 6, 1928.

O. A. HOELLER 1,690,370

AUTOMOBILE SIGNAL SWITCH

Filed July 16, 1925

Inventor
Otto A. Hoeller

By Wood & Wood

Attorneys

Patented Nov. 6, 1928.

1,690,370

UNITED STATES PATENT OFFICE.

OTTO A. HOELLER, OF CINCINNATI, OHIO.

AUTOMOBILE SIGNAL SWITCH.

Application filed July 16, 1925. Serial No. 44,119.

My invention relates to automobile signals and particularly to a switch to be used in connection with turning signal lights.

Another object is to provide a semi automatic switch mechanism operating in conjunction with the steering wheel of an automobile for a selective control of different direction indicating signals, the signal control being through a single controlling member manually operated for a selective signal electric circuit control and automatically releasable for returning the lever to a neutral position through an appropriate directional movement of the steering wheel.

One of the problems presented by the wide usage of turning signals has been that of constructing a suitable switch for positive operation and control of the signals. Customarily the driver operates the switch for lighting the proper signal to indicate the turn he wishes to make, and after turning often forgets to throw out the switch thus causing the signal to be displayed after the turn has been completed.

An object of my invention is to provide a semi-automatic switch adapted to be mounted within reach of the driver which can be manually thrown in by the driver to light the appropriate turning signal lights, and automatically thrown out by the movement of the steering wheel when the turn has been started.

Another object is to provide such a semi-automatic switch for either right or left hand signals which can be entirely manually operated independent of the steering wheel or semi-automatic feature at the option of the driver.

Other objects and advantages will be more fully set forth in the description of the accompanying drawing forming a part of this specification, in which.

Figures 1, 2, 3, 4, 5:
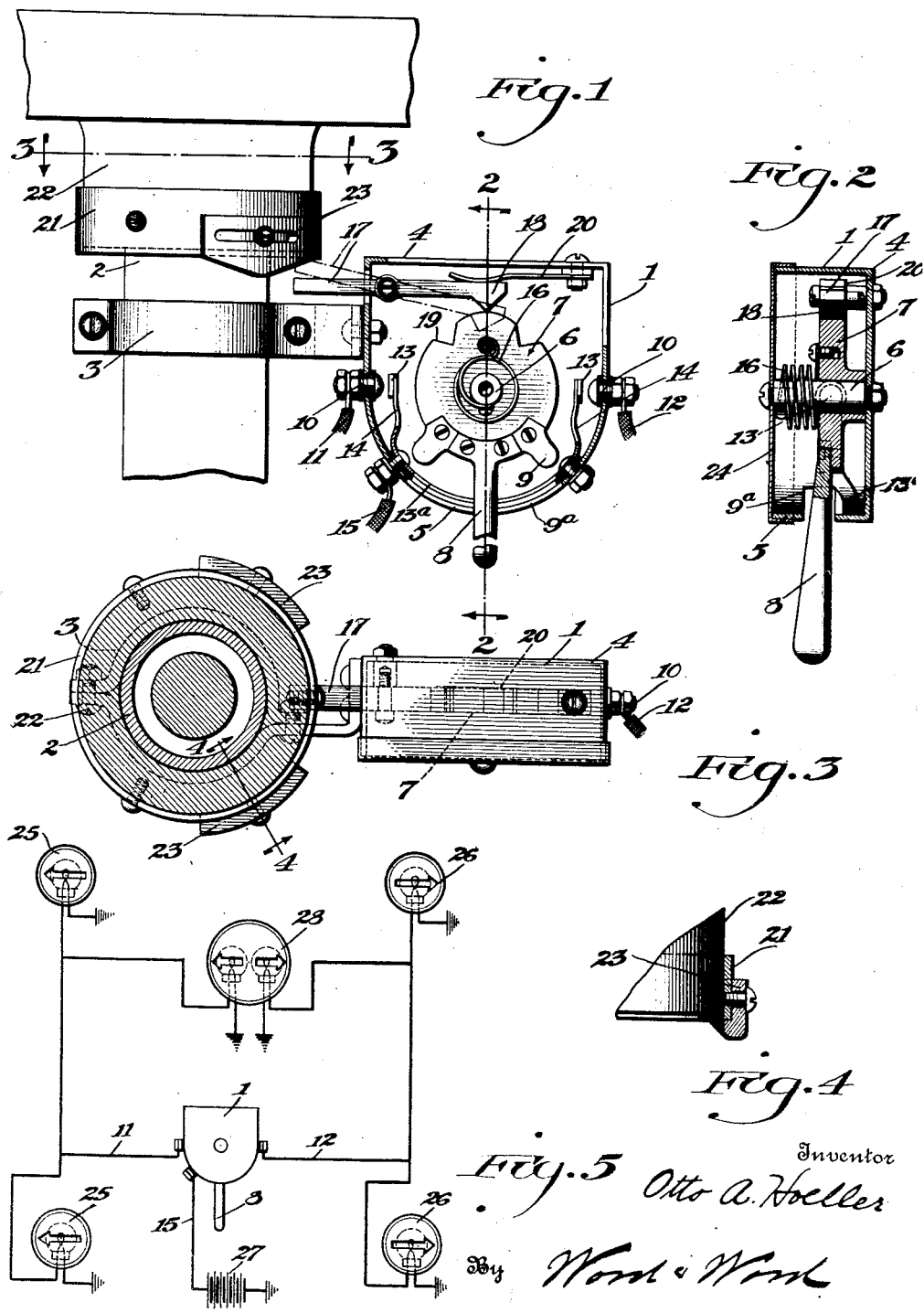
Figure 1 is a general view of my improved form of switch showing it mounted on the steering post and in operative position with the steering wheel.
Figure 2 is a sectional view taken on line 2—2, of Fig. 1, detailing the rotatable switch element.
Figure 3 is a sectional view taken on line 3—3 of Fig. 1, showing the switch in top view.
Figure 4 is a sectional view taken on line 4—4, of Fig. 3, detailing one of the cams mounted on the steering post for operating the switch.
Figure 5 is a wiring diagram showing the circuit in which the switch is placed for suitable control of the turning signals.

The switch casing 1 is mounted on the steering post 2 by means of a split bracket 3 clamped thereabout by screws, one section of the bracket having an extension on which the casing is suitably secured. As viewed in Fig. 1, the casing has its top portion 4 squared, and base portion 5 rounded or formed on a radius taken from the center of the shaft 6 mounted within the casing and rotatively carrying the switch element 7. The switch element 7 has a groove near the lower edge to receive a switch handle 8 attached thereto by screws and extending through a slot 9ᵃ in the base of the casing 1. At each side of the handle 8 and also secured in the groove, are two ears 9 of insulating material extending radially from the switch element. These ears are adapted to engage and close the electrical contacts of the switch. The electrical contacts consist of screws 10 having their heads extending to the inside of the casing, these screws being mounted in and suitably insulated from the side walls of the casing one screw on each side of the switch element 7. These screw contacts have electric connectors 11, 12, suitably connected thereto at the outer ends, and leading to the respective signal lamps. The movable contacts 13 are mounted on the ends of a metal strip 13ᵃ secured on the inner side of the rounded portion of the casing and insulated therefrom, this strip having its ends 14 of spring metal adapted to flex inwardly toward the rotative switch element. A suitable electric connector 15 is fastened to this metal strip through one of the insulated screws which hold it to the casing, this connector leading to the current source. A spring 16 is coiled about the forward end of the shaft, one end of the spring being fastened to the shaft and the other to the switch element 7 as a balancing means to return the switch element to normal position when released.

Pivotally mounted at the top of the casing and at the side toward the steering post, is a release or trip lever 17 having a detent portion 18 at the inner end for engagement with notches 19 in the periphery of the switch element, the opposite end of the lever extending under the steering wheel hub. This detent portion 18 is held against the periphery of the switch element by means of a strip of spring metal 20 having one end bearing thereagainst, the opposite end fastened in the casing 1. The notches and detent together constitute two latches adapted to hold the switch element in contact closing position.

A metal ring 21 is secured about the hub portion of the steering wheel 22 and depends slightly below the same. To this ring two cams 23 are adjustably secured by means of slots in the cams, these cams having a portion underhanging the lower edge of the ring to add to the rigidity of the structure. These cams are fastened at each side of the release lever at a distance appropriate to operate the release lever for either direction of wheel rotation. That portion of the periphery of the switch element between the notches 19 is of a radius which holds the release lever clear of the cams when the handle is not thrown.

The front of the casing 1 has a removable flanged cover plate 24 fastened thereon by means of a screw entering into the end of the shaft 6.

When the driver desires to make a turn to the left, for instance, he rotates the switch member 7 by throwing the handle portion 8 to the left. The ear 9 strikes the flexed portion of the movable contact strip 13ª forcing the movable contact 13 against the head of the contact screw 10. This completes the circuit to the particular signal lamp by joining the connectors 11 and 15. The detent portion 18 of the release lever 17 then engages the notch 19 of the switch member, the release or trip lever being in the position shown in dot and dash lines, (Fig. 1). This completes the manual operation for this turn unless the driver changes his mind about turning upon which decision he can return the handle to neutral position manually. As the steering wheel is turned the cam engages the trip lever and forces the detent 18 out of the notch in the switch element. The coiled spring then causes the switch element and handle to return to neutral position. Thus the turning of the steering wheel releases the switch and the cam is so positioned that the release takes place after a substantial portion of the turn has been completed.

The electric circuit is comparatively simple consisting merely of the connector 11 leading from the switch to lights 25 on the left of the car, front and rear, and connector 12 leading from the switch to lights 26 on the right of the car, front and rear. The connector 15 leads to the battery 27, the battery being grounded on the frame, all of the lights also being grounded on the frame to complete the circuit. An indicating light 28 to be mounted on the instrument board may be placed in the circuit to show which signal lamps are burning.

Having described my invention, I claim:

1. In combination with the steering mechanism of an automobile, a switch mechanism comprising a switch casing secured in proximity to the steering wheel, a switch mounted in said casing and manually oscillated for selective control of the circuits of a plurality of direction indicating signal lghts, said switch having grooves therein, a latch member pivotally mounted between said switch and the steering wheel, said latch member having a detent portion at one end for engaging a respective groove in said switch for maintaining the switch in circuit closing position, and the other end of said latch member extending beneath said steering wheel hub for receiving actuation therefrom to release said switch when the wheel is rotated a determined distance.

2. In combination with the steering wheel of an automobile, a switch mechanism comprising a switch casing mounted in proximity to the steering wheel, a switch rotatably mounted in said casing and manually oscillated for selective control of a plurality of direction indicating signal lights, a latch member pivotally mounted in said casing between said switch and said steering wheel, a spring engaging said latch member for maintaining it in engagement with said switch, said switch having grooves therein, said latch member having a detent portion at one end for engaging a respective groove in the switch for maintaining the switch in circuit closing position, and the other end of said latch member extending beneath the steering wheel hub for receiving actuation therefrom, and a spring engaging said switch for returning it to normal inoperative position when the steering wheel is rotated and actuates said latch member for a release of said switch.

In witness whereof, I hereunto subscribe my name.

OTTO A. HOELLER.